United States Patent
Pether et al.

(12) 
(10) Patent No.: US 6,657,636 B2
(45) Date of Patent: Dec. 2, 2003

(54) BURST SIGNAL GENERATION FOR PIPELINED ACCESS TO AMBA BUS

(75) Inventors: David N. Pether, Wokingham (GB); Mark D. Richards, Reading (GB)

(73) Assignee: LSI Logic Corporation, Milpitas, CA (US)

(*) Notice: Subject to any disclaimer, the term of this patent is extended or adjusted under 35 U.S.C. 154(b) by 359 days.

(21) Appl. No.: 09/851,712

(22) Filed: May 9, 2001

(65) Prior Publication Data

US 2002/0093504 A1 Jul. 18, 2002

(51) Int. Cl.[7] ............................................. G09G 5/37
(52) U.S. Cl. ..................................... 345/562; 345/572
(58) Field of Search ............................. 345/564, 562, 345/501, 530, 537, 538, 566, 572–574

(56) References Cited

U.S. PATENT DOCUMENTS 5,721,885 A * 2/1998 Nishide ..................... 345/562

OTHER PUBLICATIONS

"Block transfer scheme pushes VMEbus limits" by David Lieberman, Computer Design, v27, n6, p25(2), Mar. 15, 1988.*

* cited by examiner

*Primary Examiner*—Kee M. Tung
(74) *Attorney, Agent, or Firm*—Christopher P. Maiorana, P.C.

(57) ABSTRACT

A method of transferring a block of graphics data for display on a screen along a data bus between a processing block and a plurality of addresses in memory comprising the steps of (A) generating a first and a second X and Y coordinate value for each of one or more portions of data to be transferred, (B) calculating a respective address in memory of the plurality of addresses corresponding to each of the first and second coordinate values, (C) accessing the addresses to effect the data transfer, (D) determining if a plurality of bus criteria are met and (E) enabling or inhibiting transfer of the block of data in a data burst in response to the plurality of criterias being met.

20 Claims, 3 Drawing Sheets

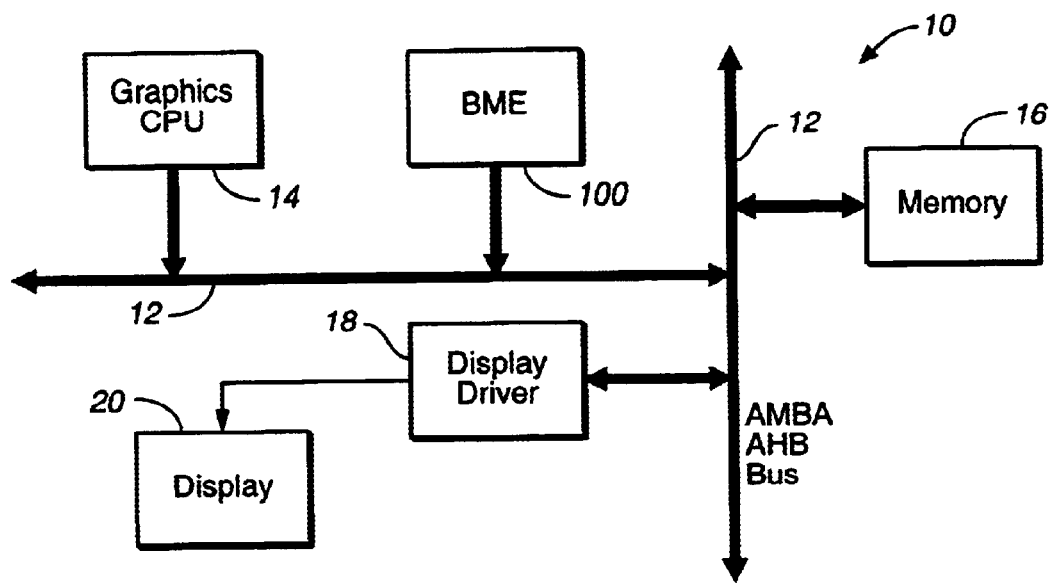
FIG._1
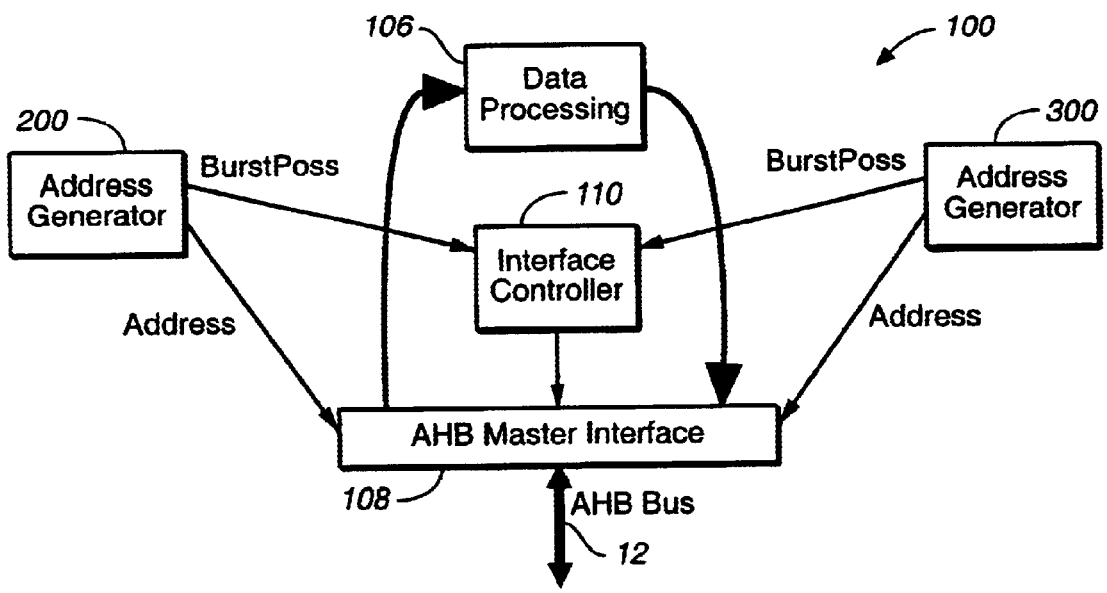
FIG._2

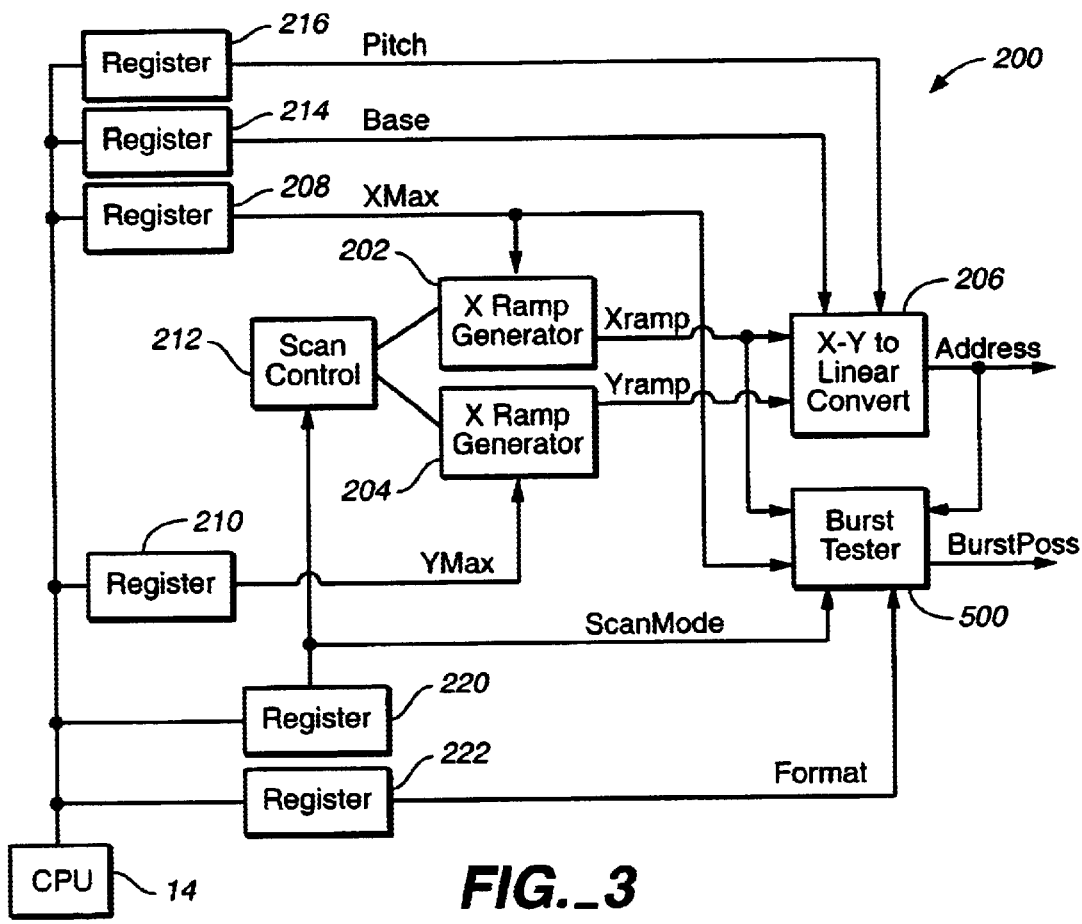
FIG._3
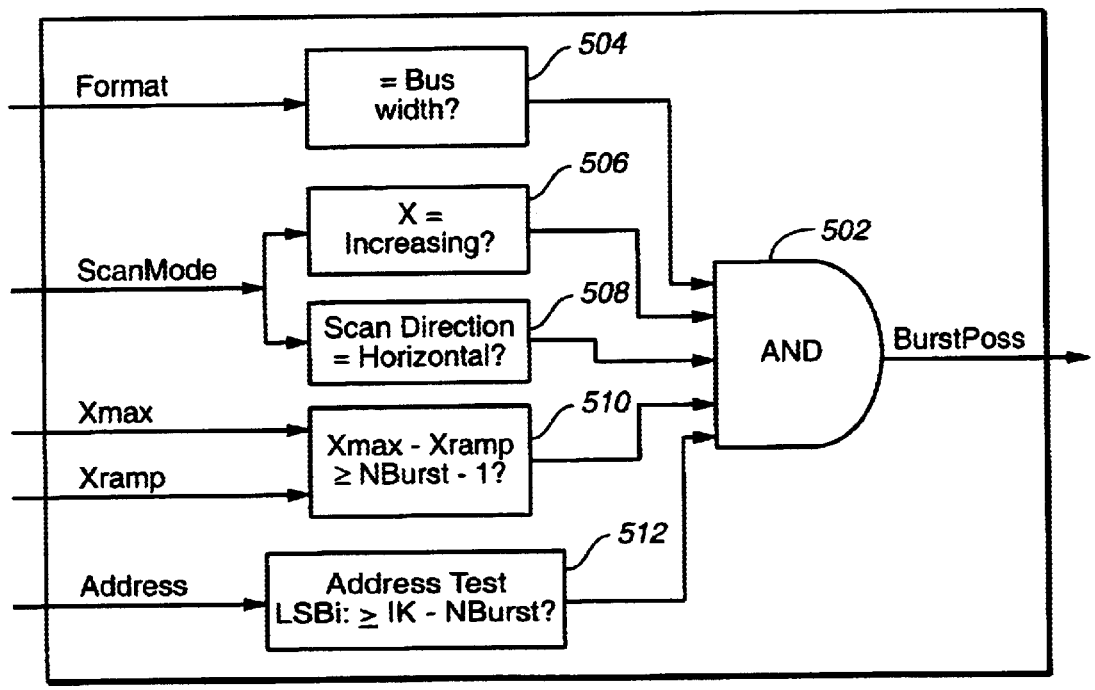
FIG._4

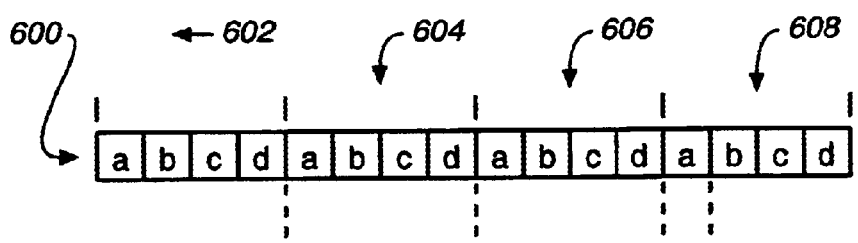
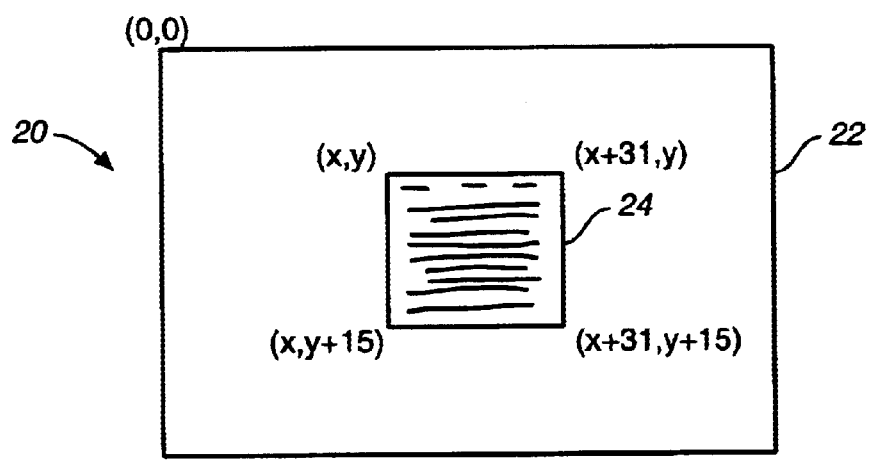
FIG._6

BURST SIGNAL GENERATION FOR PIPELINED ACCESS TO AMBA BUS

This application claims the benefit of United Kingdom Application No. 0100965.3 filed Jan. 13, 2001.

FIELD OF THE INVENTION

The present invention relates to the generation of burst data transfers generally, and, more particularly to burst data transfers using an Advanced RISC Microcontrolled Bus Architecture (AMBA) AHB bus.

BACKGROUND OF THE INVENTION

A bus is a signal route formed by a set of parallel conductors to which various items of a computer system may be connected in parallel, such that information can be transferred. The signals on the bus can be of a particular type (i.e., on a data bus or an address bus). Additionally, the signals on a bus can be intermixed. A number of widely used proprietary bus systems currently exist (i.e., the AMBA AHB bus by Advanced Risc Machines (ARM)). The AMBA AHB can be used for connecting a data processing block such as a graphics block move engine (BME) or video decoder and an area of memory.

Various dynamic memory types are used in computers, (i.e., DRAM, SDRAM, DDRDRAM, etc.). The memories transfer data to/from a data processing block in bursts of data. However, bursts of data on the AHB bus can only be used under the following conditions.

1. For high performance access to dynamic memory, each burst of data must include a fixed number of data word transfers (or beats). The fixed number being a mathematical progression of 4. Therefore, each burst of data comprises 4, 8 or 16 beats. In addition, the number of beats must be known at the start of the burst of data since unspecified length bursts cannot be implemented.

2. Full bus-width data word transfers must be used for each beat of the data burst.

3. The block of data which is read from or written to memory, which is to form the data burst must be located at consecutive, sequentially increasing addresses.

4. The sequence of consecutive addresses must not cross a 1 KB (1024 byte) word boundary.

SUMMARY OF THE INVENTION

The present invention concerns a method of transferring a block of graphics data for display on a screen along a data bus between a processing block and a plurality of addresses in memory. The method comprises the steps of (A) generating a first and a second X and Y coordinate value for each of one or more portions of data to be transferred, (B) calculating a respective address in memory of the plurality of addresses corresponding to each of the first and second coordinate values, (C) accessing the addresses to effect the data transfer, (D) determining if a plurality of bus criteria are met and (E) enabling or inhibiting transfer of the block of data in a data burst in response to the plurality of criterias being met.

The objects, features and advantages of the present invention include providing a method and/or architecture for data burst transfers that may generate bursts of data at every possible opportunity for a particular situation (e.g., when a graphics or video processing device reads or writes rectangular blocks of data). Additionally, the rectangular blocks of data may be displayed on a screen in two dimensions.

BRIEF DESCRIPTION OF THE DRAWINGS

These and other objects, features and advantages of the present invention will be apparent from the following detailed description and the appended claims and drawings in which:

FIG. 1 is a block diagram of an exemplary data processing block and AMBA AHB bus for graphics processing;

FIG. 2 is a block diagram illustrating an operation of the structure of the BME of FIG. 1;

FIG. 3 is a detailed block diagram of a preferred embodiment of the present invention for controlling the generation of bursts in the system of FIG. 1;

FIG. 4 is a block diagram of the burst tester of FIG. 3;

FIG. 5a is a timing diagram illustrating a burst of data comprising 4 beats;

FIG. 5b is a timing diagram illustrating a burst possible signal during generation of the data transfer burst of FIG. 5a; and FIG. 6 is a block diagram of a graphics screen display on a display unit.

DETAILED DESCRIPTION OF THE PREFERRED EMBODIMENTS

The present invention may provide a method of transferring a block of graphics data, for display on a screen, along a data bus between a processing block and a plurality of addresses in memory. The method may comprise the steps of (a) generating an X and Y coordinate value for each portion of data to be transferred, (b) calculating a respective address in memory of the plurality of addresses corresponding to each of the X and Y coordinate values, (c) accessing the addresses to effect the data transfer, (d) determining if the following criterion are met: (i) the format of the data to be transferred is equal to the bus width, (ii) consecutive, sequentially increasing addresses are accessed for the data transfer, (iii) the number of addresses to be stepped through in the data transfer is not less than a predetermined number of beats for each data burst, (iv) the addresses to be stepped through in the transfer do not lie across a block boundary in memory (e.g., a 1 KB block), and (e) enabling or inhibiting transfer of the block of data in a data burst in response to the criteria.

The present invention also provides an apparatus for transferring graphics data, for display on a screen, between a processing block and a plurality of addresses in memory. The apparatus may comprise an address generator, a burst tester and a controller. The address generator may generate addresses in memory to be accessed and include a scanner circuit for setting the sequence of access of the addresses. The burst tester may generate a burst possible signal in dependence on (or in response to) the addresses, the sequence of access and the data to be transferred meeting preselected criteria. The controller may be configured to initiate transfer of the data in data bursts in response to receipt of the burst possible signal.

The burst tester may be further configured to determine whether or not each of the following criteria is true (i) the format of the data to be transferred is equal to the bus width, (ii) consecutive, sequentially increasing addresses are accessed for the data transfer, (iii) the number of addresses to be stepped through in the data transfer is not less than a predetermined number of beats for each data burst, and (iv) the addresses to be stepped through in the transfer do not lie across a block boundary in memory and to generate the burst possible signal in response to all of the criteria being met.

The generation of bursts of data transfers of the present invention may be described with reference to the transfer of data between a data processing block and a memory (e.g., a block move engine (BME) and a memory). It will be appreciated that the apparatus of the present invention may be used in any situation where a graphics or video processing device, however not limited to a BME, is configured to read or write rectangular blocks of data to or from memory.

Referring to FIG. 1, a data processing system 10 is shown. The data processing system 10 implements an AMBA AHB bus 12 accessed by a graphics CPU 14 and a data processor 100 to read and write data to and from a memory 16. In one example, the data processor 100 may be implemented as a block move engine (BME). The processing system 100 may also have a display driver 18 for driving a display 20. The display 20 may be implemented as a video display unit.

Referring to FIG. 2, a simplified diagram of the structure of the BME 100 is shown. The BME 100 generally comprises an address generator 200 configured to generate read addresses, an address generator 300 configured to generating write addresses, a data processing unit 106, an AHB master interface 108 configured to enable the BME 100 to interface with the AHB bus 12 and an AHB master interface controller 110. The BME 100 may read blocks of data from the memory 16 via the bus 12 and the master interface 108. The data may then be processed by the BME 100 and written back to the memory 16 via the bus 12. The address generators 200 and 300 of the BME 100 may control the locations in the memory 16 from which data is read from and written to.

Referring to FIG. 3, a more detailed view of the address generator 200 and/or 300 is shown. However, before describing the address generator 200/300 in detail, reference to FIG. 6 may be necessary. The VDU 20 of FIG. 6 comprises a graphics screen display 22. The display 20 may comprise several million pixels with the coordinates of the pixel at the top, lefthand corner of the display being designated (0,0). The display is generated in raster order with the X coordinate increasing linearly from left to right and the Y coordinate being incremented by 1 at the end of each left to right scan. Scanning of data in the memory 16 for processing by the BME 100 may be horizontally right to left (e.g., the X coordinate may be decremented from a maximum value) and the vertical movement may also be from the bottom of the display to the top (e.g., the Y coordinate may be decremented from a maximum value to 0). However, the generation of burst of data transfers may only be possible when scanning, such that the X coordinate is incremented (from left to right) from a base coordinate. Additionally, the Y coordinate may be incremented or decremented accordingly.

The display 22 of FIG. 6 may comprises a rectangular region 24 of data to be transferred between memory locations in the memory 16. In one example, the region 24 may be 32 pixels wide and 16 pixels deep. The region 24 may have a base coordinate (x, y) for the pixel at a top left hand corner. Thus, the coordinates for the top right hand corner may be x+31, y, for the bottom left hand corner x, y+15 and for the bottom right hand corner x+31, y+15.

Referring back to FIG. 3, the address generator 200 may be an Xramp generator 202 and a Yramp generator 204 to provide respective signals Xramp and Yramp to an X-Y to linear convertor 206. A maximum value for X may be applied to the Xramp generator 202 by a reference source 208, while a maximum value for Y may be applied to the Yramp generator 204 by a reference source 210. The reference sources 208 and 210 may be in the form of registers that are written to by the CPU 14. The ramp generators 202 and 204 may be controlled by a scan control 212. The scan control 212 may control the order of the display scan, which is typically set by a scan mode register 220. The scan mode register 220 may be set by the CPU 14. In one example, the scan mode register 220 may be implemented within the BME 100.

A base generator 214 may be connected to the converter 206 and configured to set the address of the data at coordinates (X,Y) at the top left hand corner of the rectangular region to be scanned. A pitch generator 216 may apply a signal to the converter 206 that may represent the difference in addresses between successive display scan lines of data in the memory 16. The ramp generators 202 and 204, the reference value generators 208 and 210, the base generator 214, the pitch generator 216, the X-Y to linear convert 206 and the scan mode control 212 may each be implemented accordingly to meet the criteria of a particular implementation. The generators 208, 210, 214, 216 and 220 may be implemented as registers each configured store constant values for a particular operation and may be set and written to by the CPU 14.

When the BME 100 is required to read a block of data from the memory 16 for processing, the CPU 14 may set the scan mode register 220 which controls the scan control 212 to determine the direction of memory address scanning. After the direction is determined the Xramp generator 202 may apply the signal Xramp to the convertor 206. The signal Xramp may be ramped by the Xramp generator 202 from a first value (typically 0) to a maximum value set by the Xmax reference value generator 208 (or from the maximum value down to the minimum value, typically 0). The signal Xramp from the Xramp generator 202 may be applied to the convertor 206 to generate sequential, consecutive addresses for scanning the first line of the rectangular region 24 (of FIG. 6) from the coordinates x,y to the coordinates x+31, y. When the value generated by the ramp generator 202 reaches the maximum value set by the reference 208, the value may be returned to zero and the output ramping signal of the Yramp generator 204 may be increased by one to cause the converter 216 to generate the next series of consecutive addresses beginning with the address for the coordinate X, y+1. Alternatively, the Y coordinate may be decremented from y+15.

The convertor 206 may calculate the relevant address from the equation:

$$address = base + Yramp * pitch + Xramp$$

where:
  base=the address of data in the memory 16 at the base coordinate, typically (x,y);
  pitch=the difference in address between successive lines of data in the memory 16.
  Xramp=the value of the signal Xramp; and
  Yramp=the value of the signal Yramp.

The address generator 200 may also include a burst tester 500 (to be discussed in connection with FIG. 4).

The burst tester 500 may receive a signal (e.g., FORMAT) from a control register 222 and a signal (e.g., SCAN MODE) from the register 220 of the BME 100, the signal Xmax from the Xmax generator 208 and the signal Xramp from the Xramp generator 202 and the address generated by the convertor 206.

The burst tester 500 may be configured to determine from the signals the following:

1. The format of data in the memory 16 being addressed by the BME 100;
2. Whether or not the signal Xramp is incrementing;
3. Whether or not the scan direction of the memory block is horizontal (e.g., the signal Xramp is set to complete one cycle for each increment or decrement of the signal Yramp).
4. Whether or not the signal Xramp has at least (N−1) further steps to go before reaching a maximum value set by the reference generator 208, where N may be an ideal number of beats per burst for the memory architecture used. Additionally, N may be set during design of the system.
5. Whether or not the values of the start address and the end address (address+N−1) in the memory 16 being scanned by the BME 100 lie on opposite sides of a block boundary (e.g., 1 KB or 1024 byptes).

Referring to FIG. 4, a detailed architecture of the burst tester 500 is shown. Each of the previous conditions (e.g., 1–5) may be tested by a respective circuit within the burst tester 500. The burst tester 500 generally comprises a gate 502 and a number of test blocks 504, 506, 508, 510 and 512. Each of the test blocks 504–512 may provide an output signal of a first value if the condition is true and a second value if the condition is false. In one example, the first value may be a logic 1 and the second value may be a logic 0. Each of the signals input to the burst tester 500 may then be applied to a respective input of an AND gate 502 which generates an output signal referred to as a burst possible signal (e.g., BURSTPOSS). The signal BURSTPOSS may be switched between the logic states. The first logic state may indicate that the current data transfer of a first of a group of data transfers meets all the criteria for a legal burst transfer, thus subsequent data transfers may be part of the first group data burst. The second logic state may indicate that a burst transfer is not allowed. In the latter case the data transfer may proceed by individual memory accessing.

The test block 504 may receive the signal FORMAT. The signal FORMAT may indicate a number representing the format of the data which is being addressed by the BME 100 for reading from/writing to memory locations in the memory 16. The signal FORMAT may be read from the control register 222 that may be written to by the CPU 14 to set the format of the data. The control register 222 may be a register of the BME 100. For data which is in a 64-bit wide format, the signal FORMAT may represent a particular number (e.g.,7). Although it will be appreciated that any number may be set during design of the system. The signal FORMAT may be compared by the test block 504 with a preset value representing the bus width. With a particular format number and a particular bus width the test block 504 may generate a logic 1 applied to the AND gate 502. The test block 504 may be a simple comparator with a reference value for the bus width which is preset during design of the system.

The test block 506 may receive a signal from the scan mode register 222 which indicates whether or not the Xramp generator 202 is generating an increasing or decreasing value for X. The test block 506 may be a simple comparator which compares the signal SCAN MODE with a preselected reference value and generates a logic 1 if the signal SCAN MODE indicates that the X value is increasing.

The test block 508 may receive a signal from the scan mode control register 220 which indicates whether or not the scan direction is horizontal. Since the data in the memory 16 may be accessed through consecutive and sequentially increasing addresses before a burst can be sanctioned, the direction in which the memory corresponding to the display region 204 is scanned must be horizontal. If the signal SCAN MODE from the scan mode register 222 indicates that the scan direction is horizontal, then the test block 508 may generate a logic 1, which is generally applied to the AND gate 502. It will be appreciated by one skilled in the art that if it is not possible for the scan direction to be vertical then there is no need for the test block 508.

The test block 510 may receive both the Xmax reference value from the reference generator 208 and the signal Xramp from the Xramp generator 202. The test block 510 may subtract the value Xmax from the instantaneous signal Xramp value and compare the result with a predetermined value (e.g., NBurst−1), where NBurst may the ideal number of beats per burst for the architecture of the memory. Subtracting the signal Xramp value from the value Xmax may provide the number of consecutive address through which the convertor 206 may step to reach the last address in the scan (e.g., the coordinate x+31, y) for the region 24. If the number of consecutive addresses remaining is greater than or equal to a value which is one less than the ideal number of beats per burst for the memory architecture, the test block 510 may generate a logic 1 to be applied to the AND gate 502. Thus, the test block 510 may generate a logic 1 when the following condition is true:

$$Xmax - Xramp \geq NBurst - 1$$

For example, if the ideal number of beats per burst for the memory architecture is 4 and provided the number of addresses remaining to be scanned is greater than or equal to 3, then a burst data transfer may be used and the test block 510 may generate a logic 1. The address represented by the value Xramp may be the first address of the four which would be scanned during the burst data transfer, leaving the three remaining addresses to make up the four addresses scanned during the burst transfer.

The test block 512 may test whether or not consecutive addresses for data which is to form the burst transfer dos not lie across a word boundary. For example, each address which is generated by the convertor 206 may be applied to the address test block 512. The test block 512 may look at the least significant bits (LSBs) in the address which define where the address lies in a 1 KB range. The LSBs may then be compared with the number of addresses available up to the 1 KB boundary for the ideal number of beats per burst (NBurst) for the memory architecture. If the test block 512 indicates that the data which is to form the burst transfer does not occupy a data block which crosses a 1 KB block boundary, then the test block 512 may generate a logic 1 indicating that a burst transfer may take place. Thus, the address test block 512 may allow a burst transfer if the condition is true:

$$\text{Address } LSBs < 1 \text{ KB} - NBurst$$

If the condition is false then the address test 512 may generate a logic 0, preventing a burst transfer from occurring.

If each of the test blocks 504 to 512 generates a logic 1 signal indicating that the relevant conditions have been met then the AND gate 502 may provide the signal BURSTPOSS which is logic 1. The logic 1 signal BURSTPOSS may be applied to the AHB master interface controller 110. As a result, the controller 110 may initiate a burst transfer of data from the consecutive addresses rather than an individual memory address access. In order to read data from the locations in the memory 16, the address generator 200 may scan the relevant block of data 24 in a raster order. The address generator 200 may then produce the signal BURST-POSS which, when active or at logic 1 indicates that the current transfer is the first of a group which meets all the criteria for a legal burst transfer. When the signal BURST-POSS is active the AHB master interface controller 110 may initiate a burst transfer rather than an individual memory address access, and subsequent transfers are part of the burst. The process is similar for the address generator 300 when the processed data is to be written back to the memory 16.

Referring to FIG. 5a, a timing diagram illustrating an operation 600 of the present invention on data comprising four groups or blocks 602, 604, 606 and 608 of four data words (beats) is shown. Each group or block of data is transferred in a data burst. Each data word of each group is labelled a, b, c, d for ease of reference. However, such labelling is not intended to indicate that any of the data words are identical. Referring to FIG. 5b, a timing diagram illustrating an operation of the present invention of the signal BURSTPOSS generated by the burst tester 500 during burst transfer of the data operation 600 is shown. The ideal number of beats, NBurst, for each data transfer burst may be four. If the memory address of the first data word 602a is represented by N then the memory address of the last word 608d may be N+15. In addition, the address N+15 for the data word 608d may be the last address before the end of the 1 KB data block.

When the convertor 206 generates the address for the data word 602a, if the test blocks 504, 506, 508, 510 all generate a logic 1 signal, the address test block 512 may look at the least significant bits (LSBs) of the address and compare LSBs with the least significant bits (LSBs) of the fourth address from the end of the 1 KB block in which the address for the data word 602a lies. If the address test block 512 indicates that the memory address is no closer to the end of the block than the address for the data word 608a, the test block 512 may generate a logic 1 resulting in a logic 1 on the signal BURSTPOSS. As a result of this, the controller 108 may initiate a burst transfer for the data words 602a, b, c and d. The addresses for the data words 602b, 602c and 602d may also checked in the same manner by the address test 512, since the condition:

Address $LSBs < 1$ $KB - NBurst$ is still satisfied the signal BURSTPOSS may remain active.

The process may be repeated for each subsequent data word 604a, onwards. However, when the memory address for data word 608b is tested the condition may fail, since there are only 3 addresses, including 608b, to the end of the 1 KB data block. As a result, the signal BURSTPOSS from the burst tester 500 may go to logic 0, or inactive. However, since the beats forming the data burst must be a minimum of four, the data word 608b, 608c and 608d may still form part of the burst data transfer started at 608a. The present invention may enable the generation of burst accesses at every possible opportunity for the situation where a graphics (or video processing) device reads or writes rectangular blocks of data.

While the invention has been particularly shown and described with reference to the preferred embodiments thereof, it will be understood by those skilled in the art that various changes in form and details may be made without departing from the spirit and scope of the invention.

What is claimed is:

1. A method of transferring a block of graphics data, for display on a screen, along a data bus between a processing block and a plurality of addresses in memory, the method comprising the steps of:

(A) generating a first and a second coordinate value for each of one or more portions of data to be transferred;

(B) calculating a respective address in memory of said plurality of addresses corresponding to each said first and second coordinate values;

(C) accessing said plurality of addresses to effect said data transfer;

(D) determining if one or more of a plurality of bus criteria are met; and (E) enabling or inhibiting transfer of said block of data in a data burst in response to said plurality of criterias being met.

2. The method according to claim 1, wherein step (D) further comprises the sub-steps of determining whether or not each of the following criterion is true:

(D-1) the format of the data to be transferred is equal to a bus width;

(D-2) consecutive, sequentially increasing addresses are accessed for said data transfer;

(D-3) the number of addresses to be stepped through in the data transfer is not less than a predetermined number of beats for each data burst; and (D-4) the addresses to be stepped through in the transfer do not lie across a 1 KB block boundary in memory.

3. The method according to claim 2, wherein:

sub-step (D-1) further comprises (i) generating a format signal representative of the format of the data to be transferred and (ii) comparing said format signal with a value representative of the data bus width and generating a result signal in response to said comparison; and step (E) further comprises inhibiting transfer of said block of data in a data burst in response to said result signal indicating that the format of the data to be transferred is not equal to the bus width.

4. The method according to claim 2, wherein:

step (A) further comprises generating a scan mode signal for setting the sequence of addresses to be accessed during the data transfer;

sub-step (D-2) further comprises comparing said scan mode signal with a preset reference value and generating a result signal in response to said comparison; and step (E) further comprises inhibiting transfer of said block of data in a data burst in response to said result signal indicating that the addresses are not accessed in a consecutive, sequentially increasing manner for said data transfer.

5. The method according to claim 2, wherein:

sub-step (D-2) further comprises (i) monitoring the stepping of said first coordinate value and (ii) generating a result signal in response to the direction of said stepping; and step (E) further comprises inhibiting transfer of said block of data in a data burst in response to said result signal indicating that said first coordinate value is decremented.

6. The method according to claim 2, wherein:

sub-step (D-3) further comprises (i) determining the number of addresses between said end address and the accessed address of said plurality of addresses and (ii) comparing said number of addresses with said predetermined number and generating a result signal in response to the comparison; and step (E) further comprises inhibiting transfer of said block of data in a data burst in response to said result signal indicating a value of said number of addresses being less than said predetermined number.

7. The method according to claim 2, wherein:

sub-step (D-4) further comprises (i) determining whether or not the accessed address is within said predetermined number of said block boundary and (ii) generating a result signal; and step (E) further comprises inhibiting transfer of said block of data in a data burst in response to said result signal indicating that the accessed address is less than said predetermined number of addresses from said block boundary.

8. The method according to claim 1, wherein step (A) further comprises:

generating a start coordinate value for the start address of said graphics data;

generating a final coordinate value for the end address of said graphics data;

generating a start second coordinate value for the start address of said graphics data;

generating a final second coordinate value for the end address of said graphics data; and stepping said first and second coordinate values between said first and second start and end values.

9. The method according to claim 1, wherein:

sub-step (D-2) further comprises determining whether or not the first coordinate value is to be incremented between generation of each of said second coordinate values of said data and generating a result signal; and step (E) further comprises inhibiting transfer of said block of data in a data burst in response to said result signal indicating that the first coordinate value is not incremented between generation of each second coordinate value.

10. Apparatus for transferring graphics data for display on a screen along a data bus between a processing block and a plurality of addresses in memory, the apparatus comprising:

an address generator configured to generate addresses in memory to be accessed, said address generator comprising a control circuit configured to scan a sequence of access of said addresses;

a burst tester configured to generate a signal in response to (i) said addresses, (ii) said sequence of access and (iii) the data to be transferred meeting a preselected criteria; and a control circuit configured to initiate transfer of said data in data bursts in response to receipt of said signal.

11. The apparatus according to claim 10, wherein said burst tester is configured to determine whether or not one or more of the following criteria is true:

(i) the format of the data to be transferred is equal to the bus width;

(ii) consecutive, sequentially increasing addresses are accessed for said data transfer;

(iii) the number of addresses to be stepped through in the data transfer is not less than a predetermined number of beats for each data burst; and (iv) the addresses to be stepped through in the transfer do not lie across a block boundary in memory, wherein said burst tester is configured to generate said signal in response to one or more of said criteria being met.

12. The apparatus according to claim 10, comprising:

a circuit configured to generate a format signal representative of the format of the data to be transferred; and said burst tester further comprises (i) a comparator configured to compare said format signal with a predetermined value representative of a data bus width and generate a result signal in response to said comparison and (ii) an inhibiter configured to generate said signal in response to said result signal indicating that said format of said data is not identical to said data bus width.

13. The apparatus according to claim 10, comprising:

a circuit configured to generate a scan mode signal for setting the access sequence of addresses to be accessed during the data transfer; and said burst tester further comprising (i) a circuit configured to compare said scan mode signal with a preset reference value and generating a result signal in response to said comparison and (ii) a circuit configured to inhibit generation of said signal in response to said result signal indicating that the addresses are not accessed in a consecutive, sequentially increasing manner for said data transfer.

14. The apparatus according to claim 10, wherein said address generator is further configured to generate first and second coordinate values for each of one or more portions of graphics data and converter said first and second coordinate values into an address to be accessed during said data transfer.

15. The apparatus according to claim 14, wherein said address generator further comprises a ramp circuit configured to step each of said first and second coordinate values between first and second values and applying said first and second coordinate values to said converter to enable generation of said addresses to be accessed during said data transfer.

16. The apparatus according to claim 15, wherein said address generator further comprises a circuit configured to generate a scan mode signal for controlling the direction and sequence of stepping of said first and second coordinate values to determine the sequence of addresses to be accessed during the data transfer.

17. The apparatus according to claim 14, wherein said burst tester is further configured to monitor the stepping of said first coordinate value and generating a result signal in response to the direction of said stepping and inhibit transfer of said block of data in a data burst in response to said result signal indicating that said first coordinate value is decremented.

18. The apparatus according to claim 10, wherein said burst tester is further configured to determine the number of subsequent addresses to be stepped through to an end address of said plurality of addresses and comparing this with a predetermined value and generating a result signal in response to the comparison and inhibit transfer of said data in a data burst in response to said result signal indicating a value of said number of subsequent addresses being less than said predetermined number.

19. The apparatus according to claim 10, wherein said burst tester is further configured to determine the number of addresses between the accessed address and the addresses of a block boundary in said memory and comparing this with a predetermined number and generating a result signal in response to the comparison indicating whether or not the accessed address is within said predetermined number of addresses of said block boundary and inhibit transfer of said data in a data burst in response to said result signal indicating that the accessed address is less than said predetermined number of addresses from said boundary.

20. The apparatus according to claim 10, wherein said data bus comprises an AMBA AHB bus.

* * * * *